United States Patent
Duan et al.

(10) Patent No.: US 9,195,266 B2
(45) Date of Patent: Nov. 24, 2015

(54) BONDING STRUCTURE AND ELECTRONIC DEVICE USING THE SAME

(71) Applicants: Ju-Ping Duan, Shenzhen (CN); Ming-Fu Luo, Shenzhen (CN); Fa-Guang Shi, Shenzhen (CN)

(72) Inventors: Ju-Ping Duan, Shenzhen (CN); Ming-Fu Luo, Shenzhen (CN); Fa-Guang Shi, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 535 days.

(21) Appl. No.: 13/632,275

(22) Filed: Oct. 1, 2012

(65) Prior Publication Data

US 2013/0107432 A1 May 2, 2013

(30) Foreign Application Priority Data

Oct. 26, 2011 (CN) .......................... 2011 1 0329454

(51) Int. Cl.
*H05K 5/00* (2006.01)
*H05K 7/00* (2006.01)
*G06F 1/16* (2006.01)

(52) U.S. Cl.
CPC ............. *G06F 1/1626* (2013.01); *Y10T 428/13* (2015.01)

(58) Field of Classification Search
CPC ....... H05K 5/0213; H01Q 1/243; H01Q 9/04; H04M 1/02
USPC .................. 361/679.01–679.09, 679.1–679.3, 361/679.5, 679.51–679.59; 174/250–256, 174/559–565; 455/575.1, 575.3, 575.4, 455/575.8
See application file for complete search history.

(56) References Cited

U.S. PATENT DOCUMENTS

| | | | |
|---|---|---|---|
| 2008/0210843 A1* | 9/2008 | Han et al. ...................... | 248/917 |
| 2011/0267751 A1* | 11/2011 | Shimo et al. ............. | 361/679.01 |
| 2012/0127040 A1* | 5/2012 | Tang et al. .................... | 343/702 |

FOREIGN PATENT DOCUMENTS

| | | |
|---|---|---|
| CN | 201163540 Y | 12/2008 |
| CN | 201741614 U | 2/2011 |

* cited by examiner

*Primary Examiner* — Jerry Wu
(74) *Attorney, Agent, or Firm* — Novak Druce Connolly Bove + Quigg LLP

(57) ABSTRACT

A bonding structure includes a first connecting part, a second connecting part and an adhesive. The first connecting part includes a top surface and a first joining surface opposite to the top surface. The second connecting part includes a mounting surface and defines a bonding groove on the mounting surface, the second connecting part further includes positioning members in the bonding groove. The adhesive is received in the bonding groove of the second connecting part, then the first connecting part is received in the bonding groove. The first joining surface is supported by the positioning members to position the first connecting part, the adhesive is located between the first joining surface and a bottom of the bonding groove to join the first and the second connecting part together. The present disclosure further discloses an electronic device using the bonding structure.

16 Claims, 5 Drawing Sheets

BONDING STRUCTURE AND ELECTRONIC DEVICE USING THE SAME

BACKGROUND

1. Technical Field

The present disclosure relates to a connecting structure, and more particularly, to a bonding structure with a leveling plane and an electronic device using the same.

2. Description of Related Art

Electronic devices such as mobile phone, tablet, or integrated computer may include bonded structures. Adhesive is employed to combine two parts of the electronic device together. The bonded structure includes a first connecting part and a second connecting part. The second connecting part defines a bonding groove to receive adhesive on a bottom surface of the bonding groove. The first connecting part is received in the bonding groove. A height of the first connecting part is less than a depth of the bonding groove, and a top surface of the first connecting part is coplanar with a top surface of the second connecting part. However, the adhesive may be laid unevenly along the bottom surface of the bonding groove, thus the top surface of the first connecting part may not be coplanar, it may be tilted, and define an angle with the top surface of the second connecting part.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
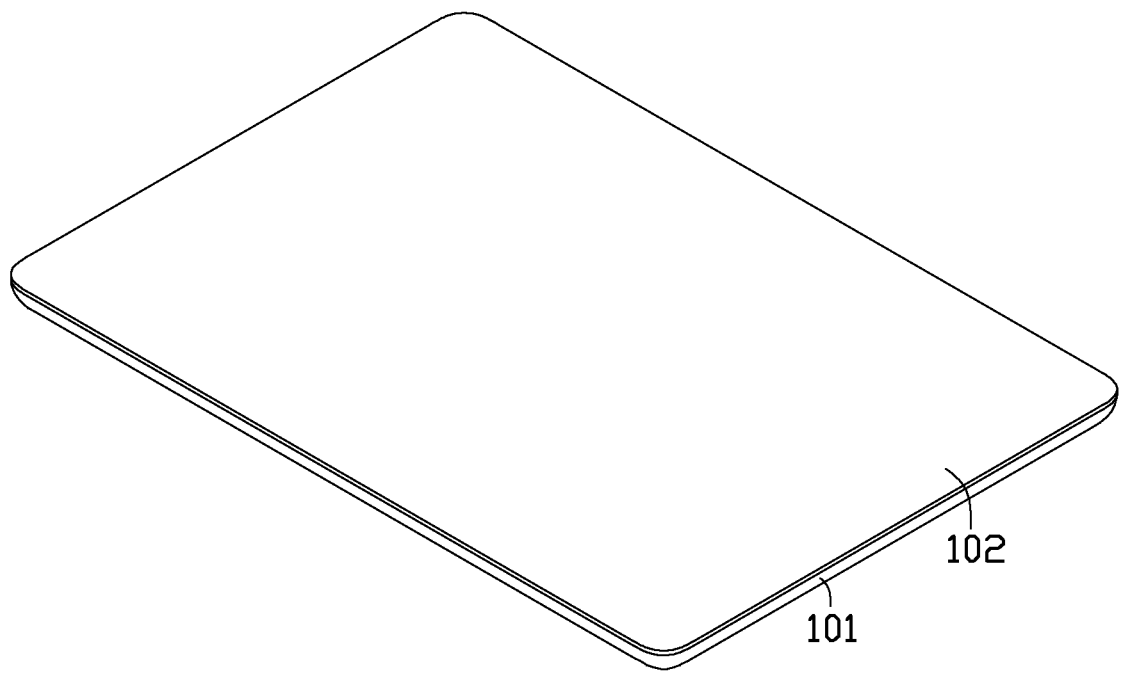
FIG. 1 is an isometric view of an embodiment of an electronic device.

FIG. 1 shows an embodiment of an electronic device 100. The electronic device 100 includes a bonding structure 101, a display screen 102 and a plurality of electronic components (not shown). The display screen 102 is fixed to the bonding structure 101, and the electronic components are received between the display screen 102 and the bonding structure 101. The plurality of electronic components are have various functions.

Figure 2:
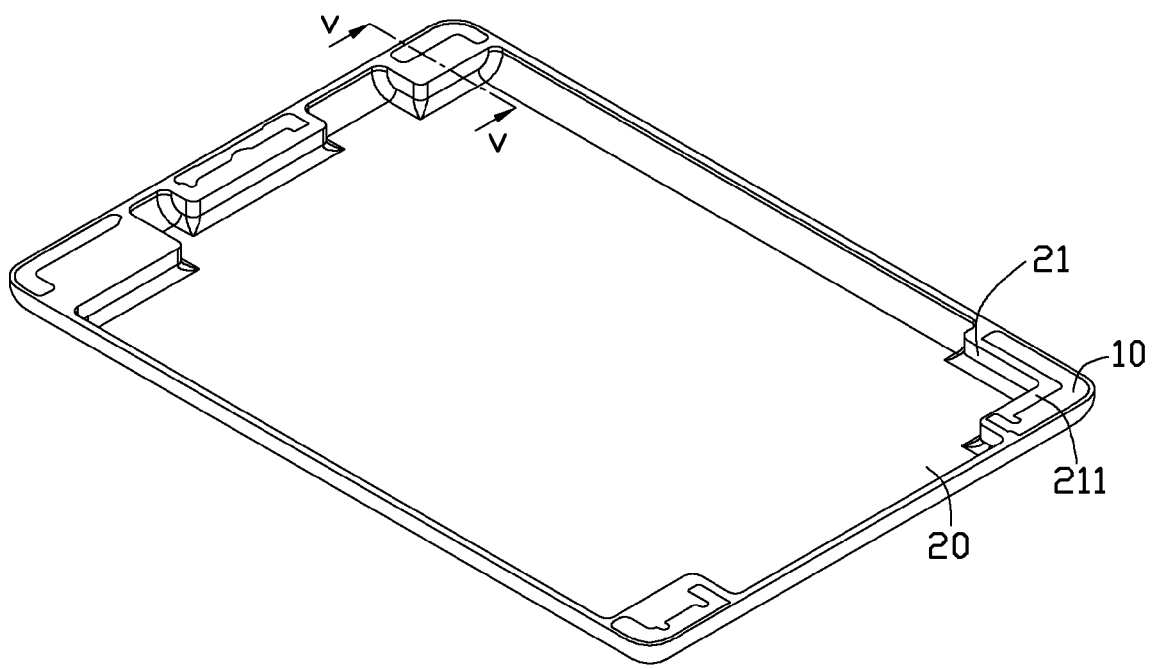
FIG. 2 is a bonding structure of the electronic device of FIG. 1.
Figure 3:
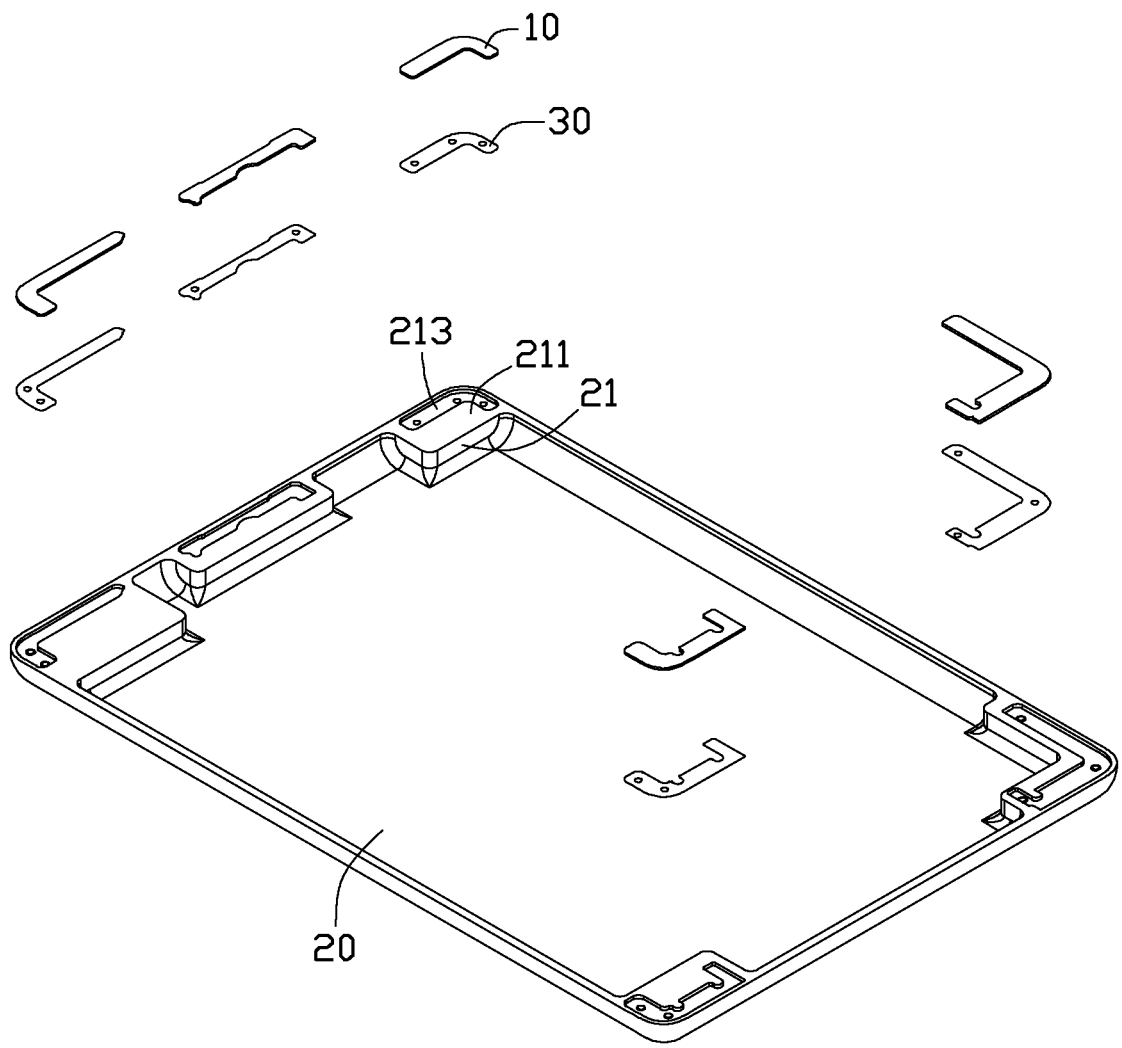
FIG. 3 is an isometric, exploded view of the bonding structure of FIG. 2.

Referring to FIGS. 2 and 3, the bonding structure 101 includes a first connecting part 10 and a second connecting part 20. The first connecting part 10 is joined to the second connecting part 20 by adhesive 30. In the embodiment, the adhesive 30 is glue. The adhesive 30 may be thermo-melt adhesive, such as a thermoplastic resin.

Figure 4:
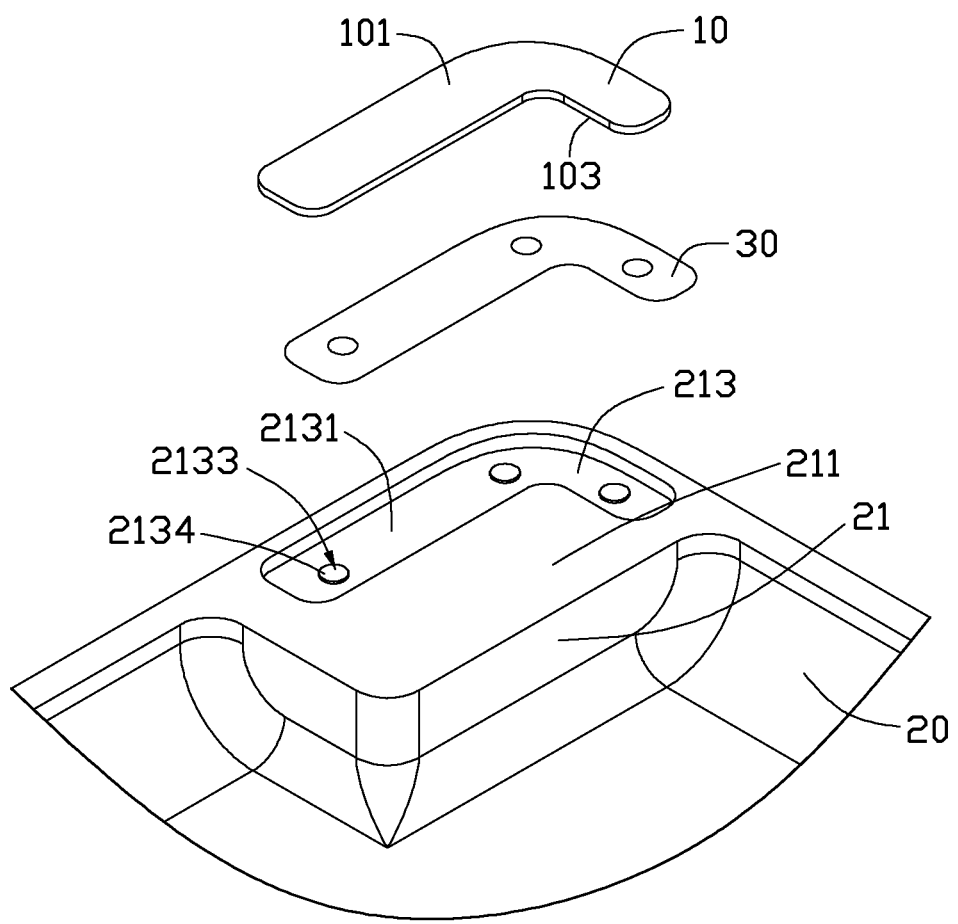
FIG. 4 is a partial, enlarged view of a portion of the bonding structure of FIG. 3.
Figure 5:
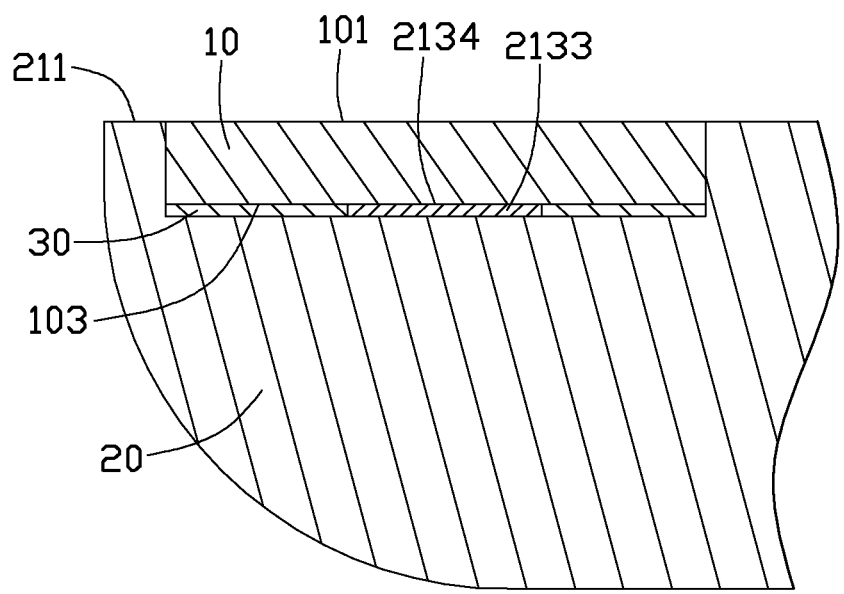
FIG. 5 is a sectional view of a portion of the bonding structure of FIG. 2, taken along line V-V.

Referring to FIGS. 4 and 5, in the embodiment, the first connecting part 10 is in the shape of a strip. The first connecting part 10 includes a top surface 101 and a first joining surface 103 opposite to the top surface 101. In the embodiment, the electronic device 100 includes a number of first connecting parts 10 (five are shown in FIG. 3) and each first connecting part 10 has a different shape.

The second connecting part 20 is a rectangular housing and includes a mounting portion 21, extending from an inner side of the housing, for each first connecting part 10. The mounting portion 21 includes a mounting surface 211 and defines a bonding groove 213 on the mounting surface 211. The bonding groove 213 receives the first connecting part 10 and the adhesive 30. The number of the mounting portions 21 may be changed as needed. The shape of each second connecting part 20 matches the shape of the first connecting part 10.

The shape of the bonding groove 213 is similar to that of the first connecting member 10. The mounting portion 21 includes a second joining surface 2131 on a bottom of the bonding groove 213 and a plurality of positioning members 2133 formed on the second joining surface 2131. Each positioning member 2133 is cylindrical and includes a resisting surface 2134 on a top thereof. The resisting surface 2134 is a flat plane parallel to the first joining surface 103. The positioning member 2133 directly supports the first joining surface 103 of the first connecting part 10 by the resisting surface 2134, thus the top surface 101 is always coplanar with the mounting surface 211. The positioning member 2133 may be in another shape. The number of the positioning members 2133 may be changed according to an available surface area of the first joining surface 103, the number of the positioning members 2133 may be one, two, or three or more.

The first joining surface 103 of the first connecting part 10 and the second joining surface 2131 of the mounting portion 21 have undergone a roughening treating to increase surface roughness. The roughening treating may be etching, blasting or laser engraving.

When joining, the adhesive 30 is received in the bonding groove 213, and the height of the adhesive 30 is greater than that of the positioning members 2133. The first connecting part 10 is received in the bonding groove 213 with the first joining surface 103 abutting against the resisting surfaces 2134 of the positioning members 2133. The adhesive 30 will flow in the bonding groove 213 under slight pressure on the first joining surface 103 to become level with the top surfaces 101. The first connecting part 10 is thus fixed in the bonding groove 213 via the adhesive 30, and the connecting surface 101 is coplanar with the mounting surface 211 of the mounting portion 21.

The first connecting part 10 is supported by the plurality of positioning members 2133 to ensure that the top surface 101 is coplanar with the mounting surface 211, any tilt angle between the first connecting surface 101 and the mounting surface 211 is prevented. The adhesive 30 can be pressed by the first joining surface 103 to keep even along the bottom of the bonding groove 213, to obtain a complete attachment and the highest combining strength. Moreover, the roughening process of the first joining surface 103 and the second joining surface 2134 further ensure that the strength of the join between the first connecting part 10 and the second connecting part 20 is higher.

The bonding structure 101 may be employed in mechanical field and upholstering field.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A bonding structure, comprising:
a first connecting part comprising a top surface and a first joining surface opposite to the top surface;
a second connecting part comprising a mounting surface and defining a bonding groove on the mounting surface, the second connecting part further comprising at least one positioning member in the bonding groove, and
an adhesive received in the bonding groove of the second connecting part, wherein the first connecting part is received in the bonding groove with the top surface coplanar with the mounting surface of the second connecting part, the first joining surface abuts against the at least one positioning member to position the first connecting part, the adhesive is received between the first joining surface of the first connecting part and a bottom of the bonding groove to combine the first and the second connecting part together, the adhesive covers the bottom of the bonding groove except for a portion of the bottom touching the at least one positioning member.

2. The bonding structure of claim 1, wherein the second connecting part comprises at least one mounting portion extending from an inner side of a sidewall thereof, the mounting surface is defined on the at least one mounting portion.

3. The bonding structure of claim 2, wherein the at least one mounting portion comprises a second joining surface on the bottom of the bonding groove, and the at least one positioning member is located on the second joining surface.

4. The bonding structure of claim 3, wherein the at least one positioning member is cylindrical and comprises a resisting surface on a top thereof to resist the first joining surface of the first connecting part.

5. The bonding structure of claim 4, wherein the resisting surface is a plane parallel to the first joining surface and abuts against the first joining surface.

6. The bonding structure of claim 5, wherein the first joining surface of the first connecting part and the second joining surface of the second connecting part have been undergone a roughening treating.

7. The bonding structure of claim 6, wherein the adhesive is a thermo welt adhesive located between the first joining surface of the first combining part and the second joining surface of the second connecting part.

8. A bonding structure, comprising:
a first connecting part comprising a top surface and a first joining surface opposite to the top surface;
a second connecting part defining a bonding groove thereon, and comprising a second joining surface at a bottom of the bonding groove and at least one positioning member on the second joining surface and at least one mounting portion extending from an inner side of sidewall thereof, the at least one mounting portion defining a mounting surface thereon, the bonding groove being defined on the mounting surface, wherein the at least one positioning member is cylindrical and comprises a resisting surface on a top thereof to resist the first joining surface of the first connecting part; and
an adhesive received in the bonding groove, wherein the first connecting part is received in the bonding groove with the top surface of the first connecting part coplanar with the mounting surface of the mounting portion, the first joining surface abuts against the at least one positioning member to position the first connecting part, the adhesive combines the first joining surface of the first connecting part and the second joining surface of the second connecting part.

9. The bonding structure of claim 8, wherein the resisting surface is a plane parallel to the first joining surface and abuts against the first joining surface.

10. The bonding structure of claim 9, wherein the first joining surface of the first connecting part and the second joining surface of the second connecting part have been undergone a roughening treating.

11. The bonding structure of claim 10, wherein the adhesive is a thermo welt adhesive located between the first joining surface of the first combining part and the second joining surface of the second connecting part.

12. An electronic device, comprising:
a bonding structure; and
a display screen mounted on the bonding structure;
the boding structure comprising:
a first connecting part comprising a top surface and a first joining surface opposite to the top surface;
a second connecting part defining a bonding groove thereon, and comprising a second joining surface at a bottom of the bonding groove and at least one positioning member on the second joining surface, and
an adhesive received in the bonding groove, wherein the first connecting part is received in the bonding groove, the first joining surface abuts against the at least one positioning member to position the first connecting part, the adhesive combines the first joining surface of the first connecting part and the second joining surface of the second connecting part, the adhesive covers the bottom of the bonding groove except for a portion of the bottom touching the at least one positioning member.

13. The electronic device of claim 12, wherein the second connecting part comprises at least one mounting portion extending from an inner side of sidewall thereof, the at least one mounting portion defines a mounting surface thereon, and the bonding groove is defined on the mounting surface.

14. The electronic device of claim 13, wherein the top surface of the first connecting part is coplanar with the mounting surface of the mounting portion.

15. The electronic device of claim 14, wherein the at least one positioning member is cylindrical and comprises a resisting surface on a top thereof to resist the first joining surface of the first connecting part.

16. The electronic device of claim 15, wherein the resisting surface is a plane parallel to the first joining surface and abuts against the first joining surface.

* * * * *